United States Patent
Zou

(10) Patent No.: US 11,353,781 B2
(45) Date of Patent: Jun. 7, 2022

(54) PHOTOGRAPHIC EQUIPMENT STAND

(71) Applicant: Shenzhen Ulanzi Technology Co. Ltd, Shenzhen (CN)

(72) Inventor: Qingqing Zou, Shenzhen (CN)

(73) Assignee: SHENZHEN ULANZI TECHNOLOGY CO. LTD, Shenzhen (CN)

( * ) Notice: Subject to any disclaimer, the term of this patent is extended or adjusted under 35 U.S.C. 154(b) by 127 days.

(21) Appl. No.: 16/892,315

(22) Filed: Jun. 4, 2020

(65) Prior Publication Data

US 2021/0294186 A1 Sep. 23, 2021

(30) Foreign Application Priority Data

Mar. 23, 2020 (CN) .......... 202020376687.X
Apr. 30, 2020 (CN) .......... 202020713439.X

(51) Int. Cl.
*G03B 17/56* (2021.01)
*F16M 11/24* (2006.01)
*F16M 11/12* (2006.01)

(52) U.S. Cl.
CPC ......... *G03B 17/561* (2013.01); *F16M 11/126* (2013.01); *F16M 11/242* (2013.01)

(58) Field of Classification Search
CPC .... G03B 17/56; G03B 17/561; G03B 17/563; G03B 17/566; F16M 11/04; F16M 11/041; F16M 11/06; F16M 11/12; F16M 11/125; F16M 11/126; F16M 11/128; F16M 11/14; F16M 11/16; F16M 11/18; F16M 11/20; F16M 11/2007; F16M 11/2035; F16M 11/22; F16M 11/242; F16M 11/38; F16M 13/04; F16M 2200/02; F16M 2200/021; F16M 2200/022; F16M 2200/024; F16C 11/04; F16C 11/0676; F16C 11/069; F16C 11/10; F16C 11/103; F16C 11/106
See application file for complete search history.

(56) References Cited

U.S. PATENT DOCUMENTS

2020/0025330 A1* 1/2020 Li ...................... F16M 11/2078

FOREIGN PATENT DOCUMENTS

CN 208126086 U * 11/2018

* cited by examiner

*Primary Examiner* — Clayton E. LaBalle
*Assistant Examiner* — Fang-Chi Chang
(74) *Attorney, Agent, or Firm* — Bayramoglu Law Offices LLC

(57) ABSTRACT

A photographic equipment stand includes a support frame, a pan-tilt head and a first cold shoe. The support frame includes a fixed base and a support leg. One end of the support leg is rotatably fixed to the bottom of the fixed base, and the support leg can be placed vertically. The pan-tilt head is detachably arranged on the top of the fixed base, and the photographic equipment can be mounted on the top of the pan-tilt head. The pan-tilt head comprises a pan-tilt head base. The pan-tilt head base is detachably arranged on a top of the fixed base. The pan-tilt head connector comprises a first connection end and a second connection end. The first connection end passes through the pan-tilt head tray and is provided with an external thread. The second connection end is rotatably connected to the pan-tilt head base.

16 Claims, 5 Drawing Sheets

PHOTOGRAPHIC EQUIPMENT STAND

CROSS REFERENCE TO THE RELATED APPLICATIONS

This application is based upon and claims priority to Chinese Patent Application No. 202020376687.X, filed on Mar. 23, 2020, and No. 202020713439.X, filed on Apr. 30, 2020, the entire contents of which are incorporated herein by reference.

TECHNICAL FIELD

The present invention relates to the technical field of photography equipment, and more particularly, to a photographic equipment stand.

BACKGROUND

With the development of social we-media in China, photographic equipment such as single-lens reflex cameras and mobile phones are frequently used in people's daily life. Photographic accessories play a crucial role in the quality of photographic works. During a photographic operation, a tripod is generally arranged along with a pan-tilt head to provide stability for cameras. The photographic equipment is arranged on the pan-tilt head, and the pan-tilt head is rotatably arranged on the tripod and can drive the photographic equipment to rotate relative to the tripod, so as to adjust the shooting angle.

At present, existing tripods with pan-tilt heads only function to provide stability for the photographic equipment. External devices such as fill lights and microphones are usually used to improve the photographic quality. Existing tripods with pan-tilt heads, however, cannot meet the requirements for the installation of external devices.

SUMMARY

According to various embodiments of the present invention, a photographic equipment stand capable of conveniently and efficiently mounting an external device is provided.

A photographic equipment stand includes:

a support frame, including a fixed base and a support leg, wherein one end of the support leg is rotatably connected to the fixed base, and the support leg can be placed vertically;

a pan-tilt head, detachably arranged on the fixed base, wherein photographic equipment can be mounted on the pan-tilt head; and a first cold shoe, arranged on the outside of the pan-tilt head and configured to mount an external device.

A photographic equipment stand includes:

a support frame, including a fixed base and a support leg, wherein one end of the support leg is rotatably connected to the fixed base, and the support leg can be placed vertically;

a second cold shoe, arranged on the support leg and configured to mount an external device; and a pan-tilt head, detachably arranged on the fixed base, wherein photographic equipment can be mounted on the pan-tilt head.

A photographic equipment stand includes:

a support frame, including a fixed base and a support leg, wherein one end of the support leg is rotatably connected to the fixed base, and the support leg can be placed vertically;

a second cold shoe, arranged on the support leg and configured to mount an external device;

a pan-tilt head, detachably arranged on the fixed base, wherein photographic equipment can be mounted on the pan-tilt head; and a first cold shoe, arranged on the outside of the pan-tilt head and configured to mount an external device.

The one or more embodiments of the present invention will be illustrated in detail hereinafter with reference to the drawings and the following descriptions. Other features, objectives and advantages of the present invention will be clearly described with reference to the description, drawings and claims.

BRIEF DESCRIPTION OF THE DRAWINGS

The description and illustration of the embodiments and/or examples of the present invention disclosed herein can refer to one or more drawings. Additional details or examples used to describe the drawings should not be construed as a limitation on the scope of any of the disclosed invention, the currently described embodiments and/or examples, and the best modes of the present invention.

DETAILED DESCRIPTION OF THE EMBODIMENTS

In order to facilitate an understanding of the present invention, the present invention will be more expressly described hereinafter with reference to the drawings. The description of the preferred embodiments of the present invention can refer to the drawings. However, the present invention can be realized in many different manners and is not limited to the embodiments described herein.

Figure 1:
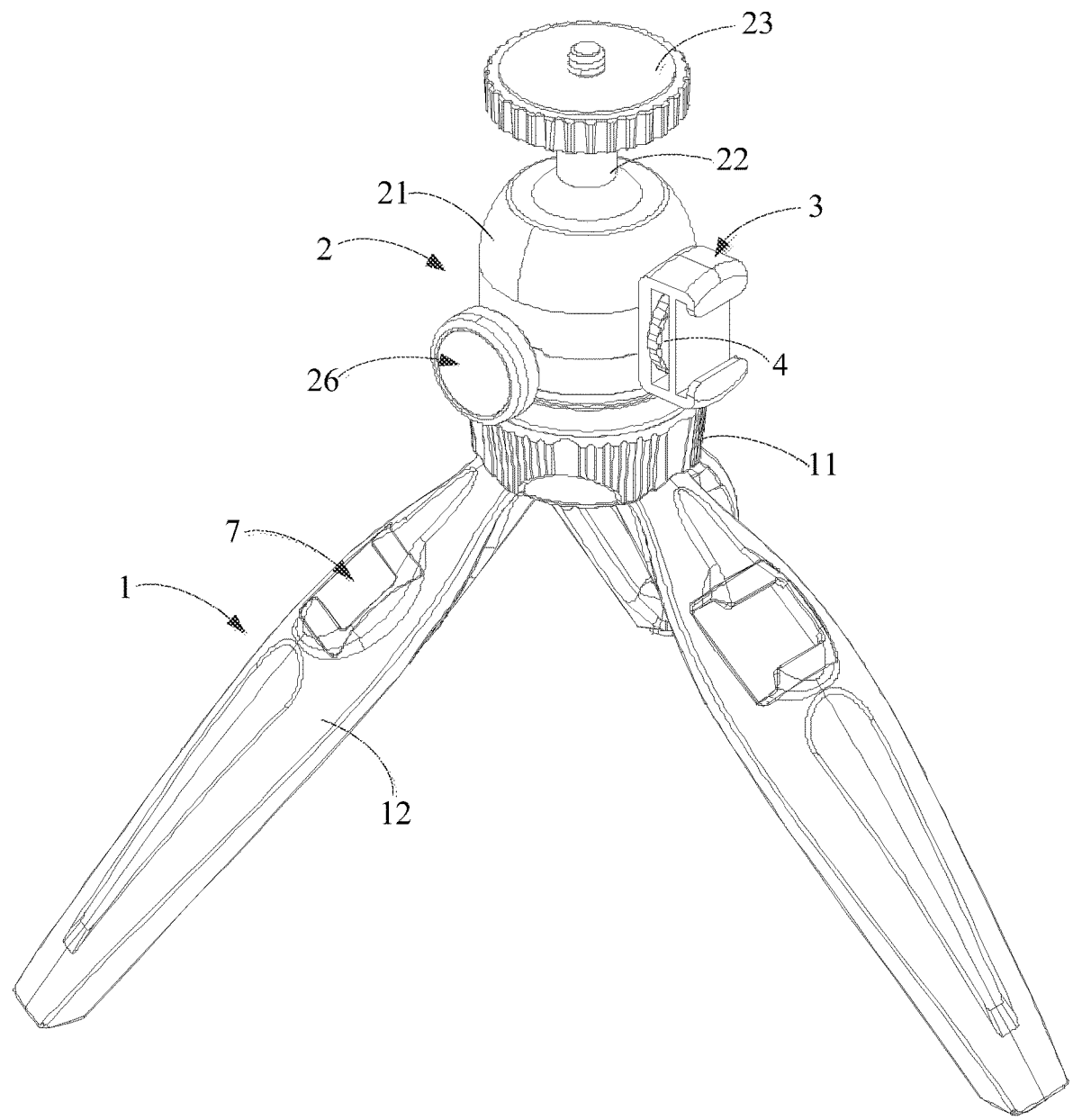
FIG. 1 is a structural schematic diagram of the photographic equipment stand according to an embodiment of the present invention.

Referring to FIG. 1, in an embodiment of the present invention, the photographic equipment stand includes the support frame 1, the pan-tilt head 2, and the first cold shoe 3. The support frame 1 includes the fixed base 11 and the support leg 12. One end of the support leg 12 is rotatably connected to the bottom of the fixed base 11. The support leg 12 can be placed vertically. The pan-tilt head 2 is detachably arranged on the top of the fixed base 11. The photographic equipment can be mounted on the top of the pan-tilt head 2. The first cold shoe 3 is arranged on the outside of the pan-tilt head 2, and is configured to mount an external device. External devices such as a fill light and a microphone, can be conveniently and quickly mounted via the first cold shoe 3 arranged on the outside of the pan-tilt head 2 to improve the photographic quality.

In an embodiment, the fixed base 11 is cylindrical. The support frame 1 is provided with three support legs 12, and the three support legs 12 are uniformly spaced along the circumferential direction of the fixed base 11, so as to form a tripod structure to provide stable support for single-lens reflex cameras, mobile phones and other devices.

Figure 2:
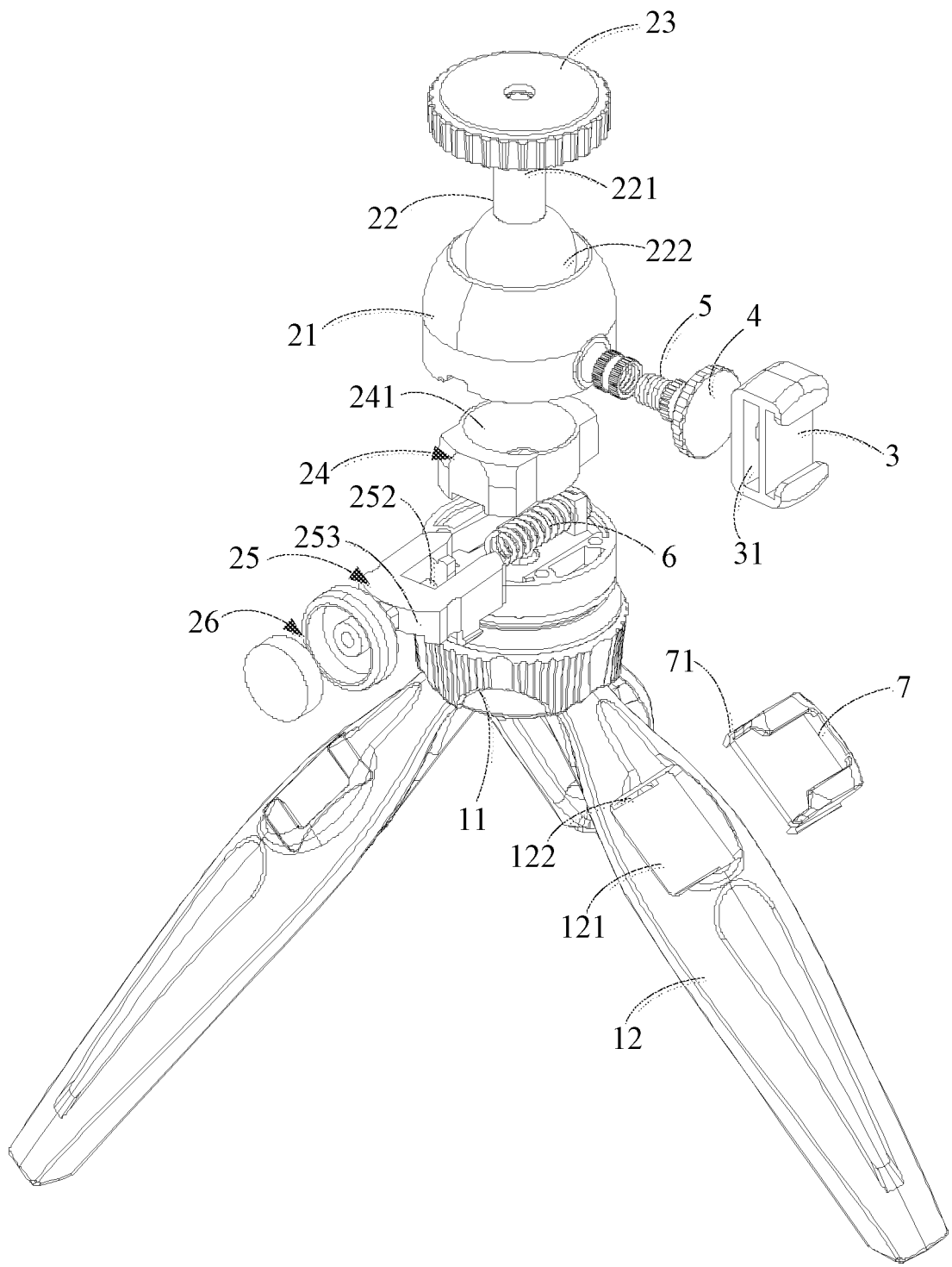
FIG. 2 is an exploded view showing the structures of the photographic equipment stand in FIG. 1.

Specifically, referring to FIG. 2, the pan-tilt head 2 includes the pan-tilt head base 21, the pan-tilt head connector 22, and the pan-tilt head tray 23. The pan-tilt head base 21 is detachably arranged at the top of the fixed base 11. The pan-tilt head connector 22 includes the first connection end 221 and the second connection end 222 opposite to each other. The first connection end 221 passes through the pan-tilt head tray 23, and the first connection end 221 is provided with an external thread. The second connection end 222 is rotatably connected to the pan-tilt head base 21. The first cold shoe 3 is arranged on the outside of the pan-tilt head base 21.

The first cold shoe 3 is locked outside the pan-tilt head base 21. Specifically, the photographic equipment stand further includes the knob 4 and the bolt 5. The cavity 31 is provided inside the first cold shoe 3. A threaded hole is provided on the outer side of the pan-tilt head base 21. One end of the bolt 5 passes through the cavity 31 and is connected to the threaded hole by means of a threaded connection. The knob 4 is located inside the cavity 31 and fixedly connected to the other end of the bolt 5. By rotating the knob 4, the bolt 5 can be driven to lock and position the first cold shoe 3 on the outside of the pan-tilt head base 21.

The first cold shoe 3 can also be clamped on the pan-tilt head base 21, or integrally formed with the pan-tilt head base 21 to form a single unit, or magnetically fixed to the pan-tilt head base 21, or adhered to the outside of the pan-tilt head base 21. It should be noted that the connection fashion between the first cold shoe 3 and the pan-tilt head base 21 is not limited to the several manners mentioned above.

Figure 3:
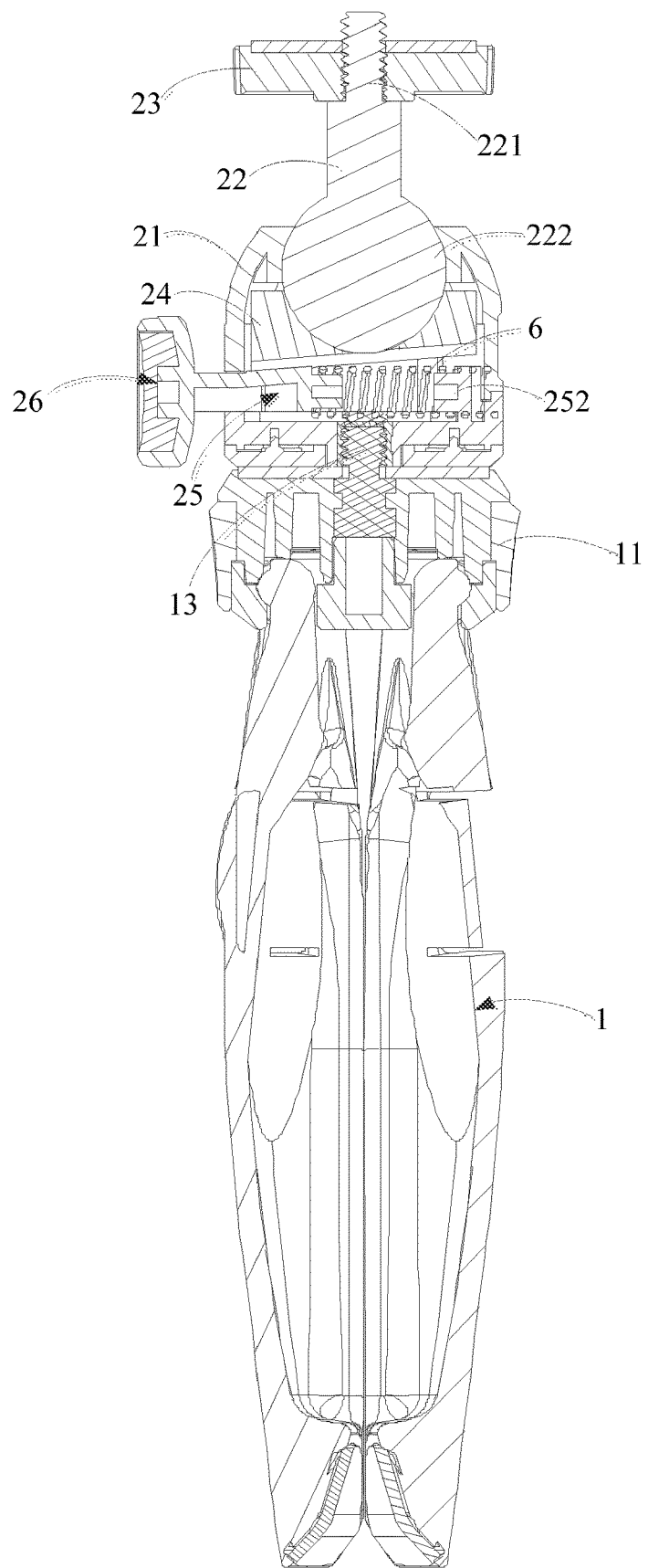
FIG. 3 is a cross-sectional view of the photographic equipment stand according to another embodiment of the present invention.

Referring to FIG. 3, in a specific embodiment, the support frame 1 further includes the first stud 13. The first stud 13 is vertically arranged at the top of the fixed base 11. The bottom of the pan-tilt head 2 is provided with a first threaded hole. The first stud 13 and the first threaded hole are connected by means of a threaded connection to mount the pan-tilt head 2 on the fixed base 11.

Further, the pan-tilt head connector 22 is a ball head connector. The ball head connector includes the ball head end, and the ball head end is rotatably connected to the pan-tilt head base 21. Namely, the ball head end is the second connection end 222 of the pan-tilt head connector 22.

Referring to FIGS. 2-3, the pan-tilt head 2 further includes the ball head locking member 24. The spherical groove 241 is provided at the top of the ball head locking member 24. The ball head locking member 24 is arranged inside the pan-tilt head base 21. The ball head end extends into the pan-tilt head base 21, and rotatably fits into the spherical groove 241.

The pan-tilt head 2 further includes the ball head button 25 and the button cap 26. The ball head button 25 is arranged inside the pan-tilt head base 21 and abuts on the bottom of the ball head locking member 24. The button cap 26 is connected to the ball head button 25. The button cap 26 is located on the outside of the pan-tilt head base 21. The button cap 26 can be pressed to push the ball head button 25 to move toward the inside of the pan-tilt head base 21, so that the ball head button 25 abuts on and moves relative to the ball head locking member 24, so as to adjust the damping between the ball head locking member 24 and the ball head end.

Figure 4:
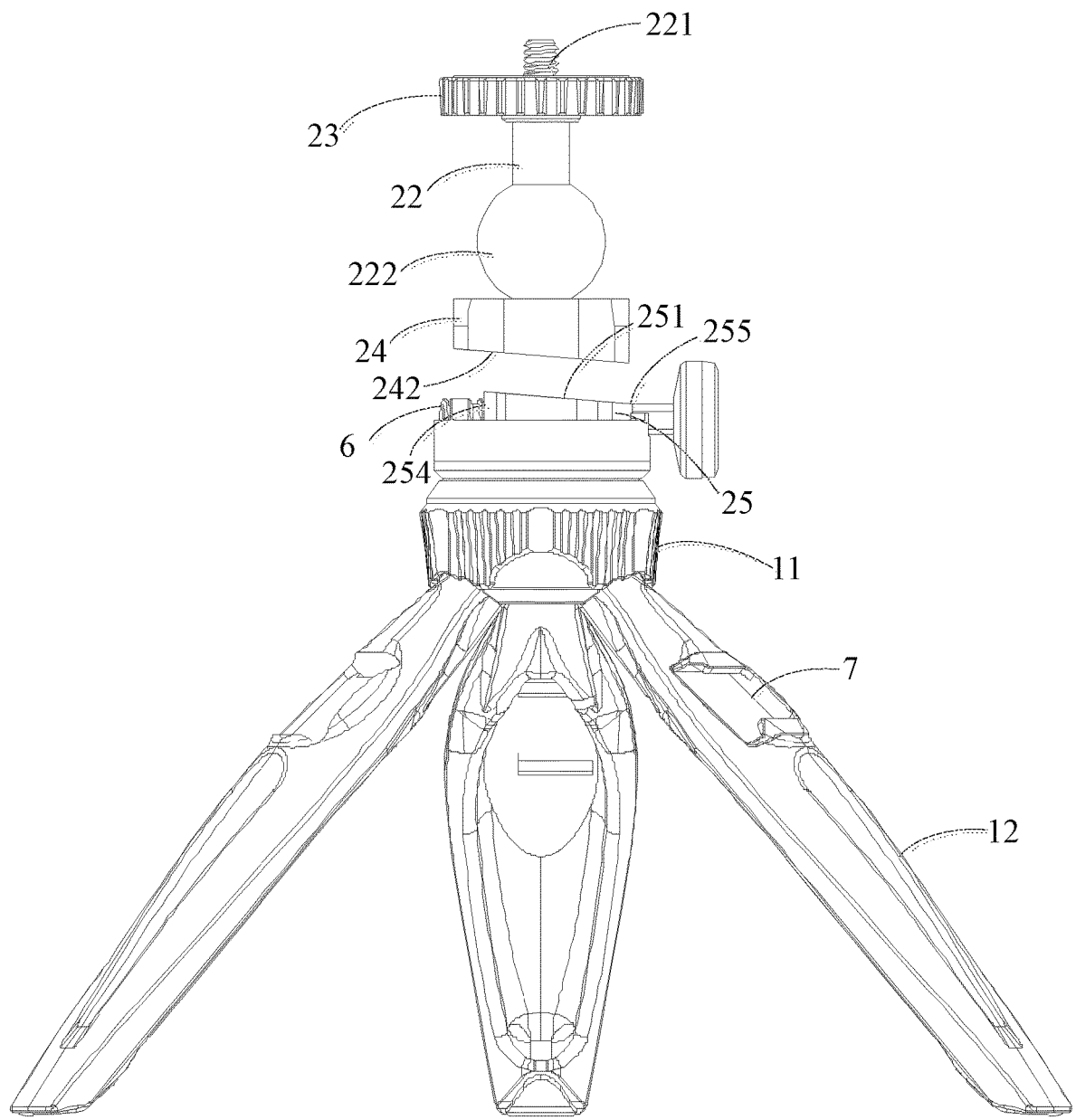
FIG. 4 is another exploded view showing the structures of the photographic equipment stand in FIG. 1.

Referring to FIG. 4, according to a specific embodiment, the top surface of the ball head button 25 is provided with the first slope 251. The bottom surface of the ball head locking member 24 is provided with the second slope 242. The inclined direction of the first slope 251 is identical to the inclined direction of the second slope 242. The first slope 251 abuts on the second slope 242. The ball head button 25 can be located at a first position and a second position in the horizontal direction. When the ball head button 25 is in the first position, the ball head button 25 pushes the ball head locking member 24 upward to dampen the contact of the ball head locking member 24 with the ball head end, and the pan-tilt head tray 23 cannot rotate relative to the pan-tilt head base 21. When the ball head button 25 slides from the first position to the second position, the first slope 251 slides along the second slope 242, so that the ball head locking member 24 descends relative to the pan-tilt head tray 23 to reduce the damping between the ball head locking member 24 and the ball head end, and the pan-tilt head tray 23 can rotate relative to the pan-tilt head base 21.

Referring to FIGS. 3-4, based on the above-mentioned embodiments, the photographic equipment stand further includes the elastic member 6. The ball head button 25 is provided with the positioning column 252 and the blocking portion 253. The elastic member 6 is provided inside the pan-tilt head base 21. One end of the elastic member 6 is connected to the inner wall of the pan-tilt head base 21. The other end of the elastic member 6 is sleeved on the positioning column 252. When the ball head button 25 is in the first position, the blocking portion 253 abuts on the inner wall of the pan-tilt head base 21 under the elastic force of the elastic member 6, and the ball head button 25 pushes the ball head locking member 24 upward. When the ball head button 25 slides from the first position to the second position, the elastic member 6 is compressed, the blocking portion 253 is separated from the inner wall of the pan-tilt head base 21, and the ball head locking member 24 descends relative to the pan-tilt head tray 23. The elastic member 6 can be a spring.

Further, the ball head button 25 includes the first end 254 and the second end 255 opposite to each other. The first end 254 is close to the elastic member 6, and the second end 255 is away from the elastic member 6. The thickness of the first end 254 is greater than the thickness of the second end 255. The first slope 251 is formed between the top of the first end 254 and the top of the second end 255.

Referring to FIG. 1, in another embodiment of the present invention, a photographic equipment stand includes the support frame 1, the second cold shoe 7, and the pan-tilt head 2. The support frame 1 includes the fixed base 11 and the support leg 12. One end of the support leg 12 is rotatably connected to the bottom of the fixed base 11. The support leg 12 can be placed vertically. The second cold shoe 7 is provided on the support leg 12 and configured to mount an external device. The pan-tilt head 2 is detachably arranged on the top of the fixed base 11. The photographic equipment can be mounted on the top of the pan-tilt head 2.

Referring to FIG. 2, in a specific embodiment, the second cold shoe 7 is clamped on the support leg 12. Specifically, the outer side surface of the support leg 12 is recessed inward to form the mounting cavity 121. The second clamping groove 122 is provided inside the mounting cavity 121. The second buckle 71 is arranged on the outer side of the second cold shoe 7. The second buckle 71 is snap-fitted into the second clamping groove 122 to mount the second cold shoe 7 in the mounting cavity 121. In this way, the connection between the second cold shoe 7 and the support leg 12 is more secure.

Figure 5:
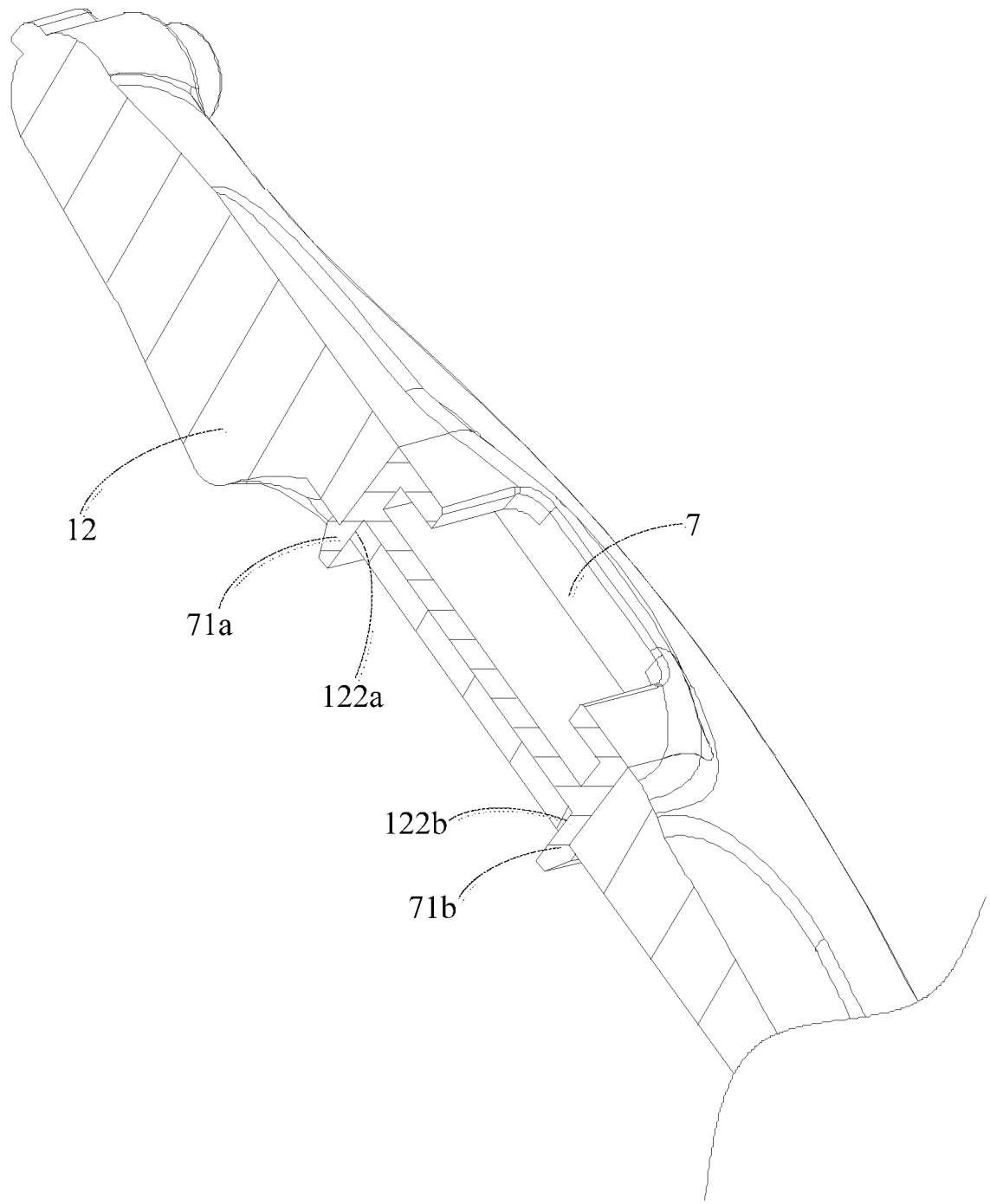
FIG. 5 is a structural schematic diagram showing the installation between the second cold shoe and the support leg of the photographic equipment stand in FIG. 1.

Referring to FIG. 5, the second clamping groove 122 includes the first slot 122a and the second slot 122b. The first slot 122a and the second slot 122b are arranged in the mounting cavity 121 and opposite to each other. The second buckle 71 includes the first buckling portion 71a and the second buckling portion 71b. The second cold shoe 7 includes the first outer side and the second outer side opposite to each other. The first buckling portion 71a is arranged on the first outer side, and the second buckling portion 71b is arranged on the second outer side. The first buckling portion 71a is clamped on the first slot 122a, and the second buckling portion 71b is clamped on the second slot 122b.

The second buckle 71 extends diagonally from the bottom of the second cold shoe 7 to the top of the second cold shoe 7. The second buckle 71 includes the first buckle end close to the bottom of the second cold shoe 7 and the second buckle end close to the top of the second cold shoe 7. The cross-sectional area of the first buckle end is smaller than the cross-sectional area of the second buckle end. In this way, the snap-fit connection between the second cold shoe 7 and the support leg 12 is more secure.

The fixed connection between the second cold shoe 7 and the support leg 12 can also be realized by a magnetic attraction, affixing, integral forming and locking, or other known fastening means. The connection fashion between the second cold shoe 7 and the supporting leg 12 is not limited to the several manners mentioned above.

Referring to FIG. 1, in another embodiment of the present invention, a photographic equipment stand includes the support frame 1, the pan-tilt head 2, the first cold shoe 3, and the second cold shoe 7. The support frame 1 includes the fixed base 11 and the support leg 12. One end of the support leg 12 is rotatably connected to the bottom of the fixed base 11. The support leg 12 can be placed vertically. The second cold shoe 7 is arranged on the support leg 12. The pan-tilt head 2 is detachably arranged on the top of the fixed base 11. The photographic equipment can be mounted on the top of the pan-tilt head 2. The first cold shoe 3 is arranged on the outside of pan-tilt head 2. External devices such as a fill light, a microphone and others can be mounted conveniently and quickly via the first cold shoe 3 and the second cold shoe 7 to improve the photographic quality.

It should be noted that the first cold shoe 3 can be replaced with a first hot shoe, and the second cold shoe 7 can be replaced with a second hot shoe.

The detailed description of the embodiments described above only illustrate several embodiments of the present invention, but cannot be construed as a limitation on the scope of the present invention. It should be noted that those having ordinary skill in the art can make several modifications and improvements without departing from the idea of the present invention, and these modifications and improvements would fall within the scope of protection of the present invention. Therefore, the scope of protection of the present invention shall be subject to the appended claims.

What is claimed is:

1. A photographic equipment stand, comprising:
   a support frame,
   a pan-tilt head, and
   a first cold shoe;
   wherein
   the support frame comprises a fixed base and a support leg, wherein one end of the support leg is rotatably connected to the fixed base, and the support leg is placed vertically;
   the pan-tilt head is detachably arranged on the fixed base, and photographic equipment is mounted on the pan-tilt head; and
   the first cold shoe is arranged on an outside of the pan-tilt head and configured to mount an external device, wherein, the pan-tilt head comprises a pan-tilt head base, a pan-tilt head connector, and a pan-tilt head tray; the pan-tilt head base is detachably arranged on a top of the fixed base; the pan-tilt head connector comprises a first connection end and a second connection end, wherein the first connection end and the second connection end are opposite to each other, the first connection end passes through the pan-tilt head tray, the first connection end is provided with an external thread, the second connection end is rotatably connected to the pan-tilt head base, and the first cold shoe is arranged on an outside of the pan-tilt head base.

2. The photographic equipment stand according to claim 1, wherein, the fixed base is cylindrical, the support frame comprises three support legs, and the three support legs are uniformly spaced along a circumferential direction of the fixed base.

3. The photographic equipment stand according to claim 1, wherein, the first cold shoe is integrally formed with the pan-tilt head base to form a single unit.

4. The photographic equipment stand according to claim 1, further comprising a first magnet and a second magnet; the first magnet is arranged on the first cold shoe; the second magnet is arranged on the outside of the pan-tilt head base; the first magnet and the second magnet are magnetically attracted.

5. The photographic equipment stand according to claim 1, further comprising a knob and a bolt; an inside of the first cold shoe is provided with a cavity; the outside of the pan-tilt head base is provided with a threaded hole; a first end of the bolt passes through the cavity and is screwed to the threaded hole; the knob is located inside the cavity and is fixedly connected to a second end of the bolt.

6. The photographic equipment stand according to claim 1, wherein, the pan-tilt head connector is a ball head connector, the ball head connector comprises a ball head end, and the ball head end is rotatably connected to the pan-tilt head base.

7. The photographic equipment stand according to claim 6, wherein, the pan-tilt head further comprises a ball head locking member; a top of the ball head locking member is provided with a spherical groove; the ball head locking member is arranged inside the pan-tilt head base; the ball head end extends into the pan-tilt head base, and the ball head end rotatably fits into the spherical groove.

8. The photographic equipment stand according to claim 7, wherein, the pan-tilt head further comprises a ball head button and a button cap, the ball head button is arranged inside the pan-tilt head base and abuts on a bottom of the ball head locking member; the button cap is connected to the ball head button; the button cap is located on the outside of the pan-tilt head base; the button cap is pressed to push the ball head button to abut on the ball head locking member.

9. The photographic equipment stand according to claim 8, wherein, a top surface of the ball head button is provided with a first slope; a bottom surface of the ball head locking member is provided with a second slope; an inclined direction of the first slope is identical to an inclined direction of the second slope; the first slope abuts on the second slope; the ball head button is located at a first position or a second position; when the ball head button is located at the first position, the ball head button pushes the ball head locking member upward; when the ball head button slides from the first position to the second position, the first slope slides along the second slope, and the ball head locking member descends relative to the pan-tilt head tray.

10. The photographic equipment stand according to claim 9, further comprising an elastic member; the ball head button is provided with a positioning column and a blocking portion; the elastic member is arranged inside the pan-tilt head base; a first end of the elastic member is connected to an inner wall of the pan-tilt head base, and a second end of the elastic member is sleeved on the positioning column; when the ball head button is located at the first position, the blocking member abuts on the inner wall of the pan-tilt head base under an elastic force of the elastic member, and the ball head button pushes the ball head locking member upward; when the ball head button slides from the first position to the second position, the elastic member is compressed, the blocking member is separated from the inner wall of the pan-tilt head base, and the ball head locking member descends relative to the pan-tilt head tray.

11. The photographic equipment stand according to claim 10, wherein, the ball head button comprises a first end of the ball head button and a second end of the ball head button, wherein the first end of the ball head button and the second end of the ball head button are opposite to each other, the first end of the ball head button is close to the elastic member, and the second end of the ball head button is away from the elastic member; a thickness of the first end of the ball head button is greater than a thickness of the second end of the ball head button; and the first slope is formed between a top of the first end of the ball head button and a top of the second end of the ball head button.

12. A photographic equipment stand, comprising:
a support frame,
a second cold shoe, and
a pan-tilt head;
wherein
the support frame comprises a fixed base and a support leg, wherein one end of the support leg is rotatably connected to the fixed base, and the support leg is placed vertically;
the second cold shoe is arranged on the support leg and configured to mount an external device; and
the pan-tilt head is detachably arranged on the fixed base, and photographic equipment is mounted on the pan-tilt head, wherein, an outer side surface of the support leg is recessed inward to form a mounting cavity; a second clamping groove is arranged inside the mounting cavity: a second buckle is arranged on an outside of the second cold shoe: the second buckle is snap-fitted into the second clamping groove, and the second cold shoe is mounted inside the mounting cavity.

13. The photographic equipment stand according to claim 12, wherein, the second cold shoe is clamped on the support leg.

14. The photographic equipment stand according to claim 12, wherein, the second clamping groove comprises a first slot and a second slot; the first slot and the second slot are arranged in the mounting cavity and opposite to each other; the second buckle comprises a first buckling portion and a second buckling portion; the second cold shoe comprises a first outer side and a second outer side, wherein the first outer side and the second outer side are opposite to each other; the first buckling portion is arranged on the first outer side, and the second buckling portion is arranged on the second outer side; the first buckling portion is clamped on the first slot, and the second buckling portion is clamped on the second slot.

15. The photographic equipment stand according to claim 14, wherein, the second buckle extends diagonally from a bottom of the second cold shoe to a top of the second cold shoe; the second buckle comprises a first buckle end and a second buckle end, wherein the first buckle end is close to the bottom of the second cold shoe, and the second buckle end is close to the top of the second cold shoe; a cross-sectional area of the first buckle end is smaller than a cross-sectional area of the second buckle end.

16. A photographic equipment stand, comprising:
a support frame,
a second cold shoe,
a pan-tilt head, and
a first cold shoe;
wherein
the support frame comprises a fixed base and a support leg, wherein one end of the support leg is rotatably connected to the fixed base, and the support leg is placed vertically;
the second cold shoe is arranged on the support leg and configured to mount an external device; and
the pan-tilt head is detachably arranged on the fixed base, and photographic equipment is mounted on the pan-tilt head; and
the first cold shoe is arranged on an outside of the pan-tilt head and configured to mount an external device, wherein, an outer side surface of the support leg is recessed inward to form a mounting cavity; a second clamping groove is arranged inside the mounting cavity; a second buckle is arranged on an outside of the second cold shoe; the second buckle is snap-fitted into the second clamping groove, and the second cold shoe is mounted inside the mounting cavity.

* * * * *